(12) United States Patent
Jones et al.

(10) Patent No.: US 11,859,322 B1
(45) Date of Patent: Jan. 2, 2024

(54) SYSTEMS AND METHODS FOR MAKING MULTI-LAYER MELTBLOWN MATS

(71) Applicant: SpillTech Environmental, Inc., Mobile, AL (US)

(72) Inventors: Mark Francis Jones, Pereira (CO); Anthony J. Ruggery, Duncansville, PA (US); Perry F. Hartge, Cranberry, PA (US); Brian Jay Decker, Silverhill, AL (US)

(73) Assignee: SpillTech Environmental, Inc., Mobile, AL (US)

( * ) Notice: Subject to any disclaimer, the term of this patent is extended or adjusted under 35 U.S.C. 154(b) by 72 days.

(21) Appl. No.: 17/347,112

(22) Filed: Jun. 14, 2021

Related U.S. Application Data

(60) Provisional application No. 63/038,387, filed on Jun. 12, 2020.

(51) Int. Cl.

| | |
|---|---|
| *B29C 48/21* | (2019.01) |
| *B32B 37/24* | (2006.01) |
| *D01D 13/02* | (2006.01) |
| *D04H 3/16* | (2006.01) |
| *D04H 5/06* | (2006.01) |
| *D04H 1/56* | (2006.01) |

(Continued)

(52) U.S. Cl.
CPC .......... *D04H 1/56* (2013.01); *B29C 48/0021* (2019.02); *B32B 37/203* (2013.01); *B32B 37/206* (2013.01); *D01D 5/0985* (2013.01); *D04H 1/559* (2013.01); *D04H 3/02* (2013.01); *B32B 5/022* (2013.01); *B32B 5/268* (2021.05); *B32B 5/271* (2021.05); *D10B 2401/022* (2013.01)

(58) Field of Classification Search
CPC ..... B29C 48/0021; B29C 48/21; B32B 5/022; B32B 5/268; B32B 5/271; B32B 37/203; B32B 37/206; B32B 37/24; D01D 5/0985; D01D 13/02; D04H 1/559; D04H 1/56; D04H 3/16; D04H 5/06
USPC ...... 264/172.19, 211.12, 518, 555; 425/72.2, 425/505, 506; 156/167, 244.11, 500; 442/381, 389, 392, 393, 400
See application file for complete search history.

(56) References Cited

U.S. PATENT DOCUMENTS

| | | |
|---|---|---|
| 4,935,276 A | 6/1990 | Pawlowski et al. |
| 6,607,630 B2 | 8/2003 | Bartman et al. |

(Continued)

*Primary Examiner* — Leo B Tentoni
(74) *Attorney, Agent, or Firm* — Alan G. Towner; Leech Tishman Fuscaldo & Lampl

(57) ABSTRACT

Systems and methods are disclosed for producing multi-layer meltblown mats. The method includes depositing first meltblown fibers onto a first moving surface such as a conveyor belt to form a first layer of meltblown fibers, and depositing second meltblown fibers onto a second moving surface such as a conveyor belt to form a second layer of meltblown fibers. The first and second layers of meltblown fibers are fed through opposed rollers to form combined meltblown layers comprising the first layer of meltblown fibers and the second layer of meltblown fibers. The combined meltblown layers are bonded together to produce a bonded multi-layer meltblown sheet. The bonded multi-layer meltblown sheet has a first outer exposed surface formed by contact of the first layer of meltblown fibers with the first moving surface, and a second outer exposed surface formed by contact of the second layer of meltblown fibers with the second moving surface.

26 Claims, 3 Drawing Sheets

(51) Int. Cl.
*D04H 1/559* (2012.01)
*D04H 3/02* (2006.01)
*D01D 5/098* (2006.01)
*B29C 48/00* (2019.01)
*B32B 37/20* (2006.01)
*B32B 5/02* (2006.01)
*B32B 5/26* (2006.01)

(56) References Cited

U.S. PATENT DOCUMENTS

| | | |
|---|---|---|
| 10,028,866 B2 | 7/2018 | Xu et al. |
| 2011/0081529 A1 * | 4/2011 | Richeson ............... B32B 5/022 |
| | | 442/381 X |

* cited by examiner

SYSTEMS AND METHODS FOR MAKING MULTI-LAYER MELTBLOWN MATS

CROSS-REFERENCE TO RELATED APPLICATION

This application claims the benefit of U.S. Provisional Patent Application No. 63/038,387 filed Jun. 12, 2020, which is incorporated herein by reference.

FIELD OF THE INVENTION

The present invention relates to systems and methods for making multi-layer meltblown mats.

BACKGROUND INFORMATION

The production of meltblown webs is known in the nonwoven materials industry, as is the production of heavy weight meltblown mats, primarily used in the absorbents industry. The meltblown webs take many forms and can be produced as meltblown-only materials or can be laminated with other substrates to provide materials with multiple layers and unique properties.

The heavy-weight, meltblown-only mats are very absorbent. However, they have several inherent disadvantages. One such disadvantage is the inherently low tensile property of such nonwoven meltblown mats. Another disadvantage is associated with the high level of free or loose fibers on the surface of the mat. When forming meltblown mats in a horizontal manner, utilizing a forming drum, the resulting mat will have a smooth side and a fibrous side. The smooth side is the result of the meltblown fibers coming in direct contact with the surface of the forming drum, while the fibrous side is the result of the meltblown fibers accumulating on top of the fibers that are in direct contact with the forming surface of the drum. The same issue occurs with heavy weight meltblown mats that are produced in a vertical manner, with the meltblown fibers being blown downward onto the flat conveyor belt, or forming fabric, of a typical web former. The resultant meltblown mat exhibits the same smooth side and fibrous side.

Meltblown webs may be laminated with other, lighter weight meltblown webs in order to provide a smoother surface to the meltblown mat. This can be accomplished through the use of an unwind whereby a pre-manufactured meltblown web is fed into the process just after the meltblown mat is produced, so that the pre-manufactured meltblown web comes in contact with the top, fibrous layer of the meltblown mat. The two substrates are subsequently laminated together through thermal bonding, ultrasonics, or other such bonding technologies. This has the effect of covering the loose, free meltblown fibers that are on the top of the mat, thereby providing a smooth surface on the top of the mat, which is similar to the smooth surface on the bottom of the mat.

SUMMARY OF THE INVENTION

An aspect of the present invention is to provide a method of making multi-layer meltblown mats. The method comprises depositing first meltblown fibers onto a first moving surface such as a conveyor belt to form a first layer of meltblown fibers, depositing second meltblown fibers onto a second moving surface such as a conveyor belt to form a second layer of meltblown fibers, feeding the first and second layers of meltblown fibers through opposed rollers to form combined meltblown layers comprising the first layer of meltblown fibers and the second layer of meltblown fibers, and bonding the combined meltblown layers to produce a bonded multi-layer meltblown sheet. The bonded multi-layer meltblown sheet has a first outer exposed surface formed by contact of the first layer of meltblown fibers with the first moving surface and a second outer exposed surface formed by contact of the second layer of meltblown fibers with the second moving surface.

Another aspect of the present invention is to provide a multi-layer meltblown mat produced by the method described above.

A further aspect of the present invention is to provide an apparatus for making multi-layer meltblown mats. The apparatus comprises a first forming box including a first conveyor belt and a first meltblown head located above the first conveyor belt structured and arranged to deposit first meltblown fibers onto the first conveyor belt to form a first layer of meltblown fibers, a second forming box comprising a second conveyor belt and a second meltblown head located above the second conveyor belt structured and arranged to deposit second meltblown fibers onto the second conveyor belt to form a second layer of meltblown fibers, and opposed rollers adjacent the first forming box and the second forming box structured and arranged to receive and combine together the first layer of meltblown fibers from the first conveyor belt and the second layer of meltblown fibers from the second conveyor belt to thereby form combined meltblown layers comprising the first layer of meltblown fibers and the second layer of the meltblown fibers.

These and other aspects of the present invention will be more apparent from the following description.

DETAILED DESCRIPTION

Figure 1:
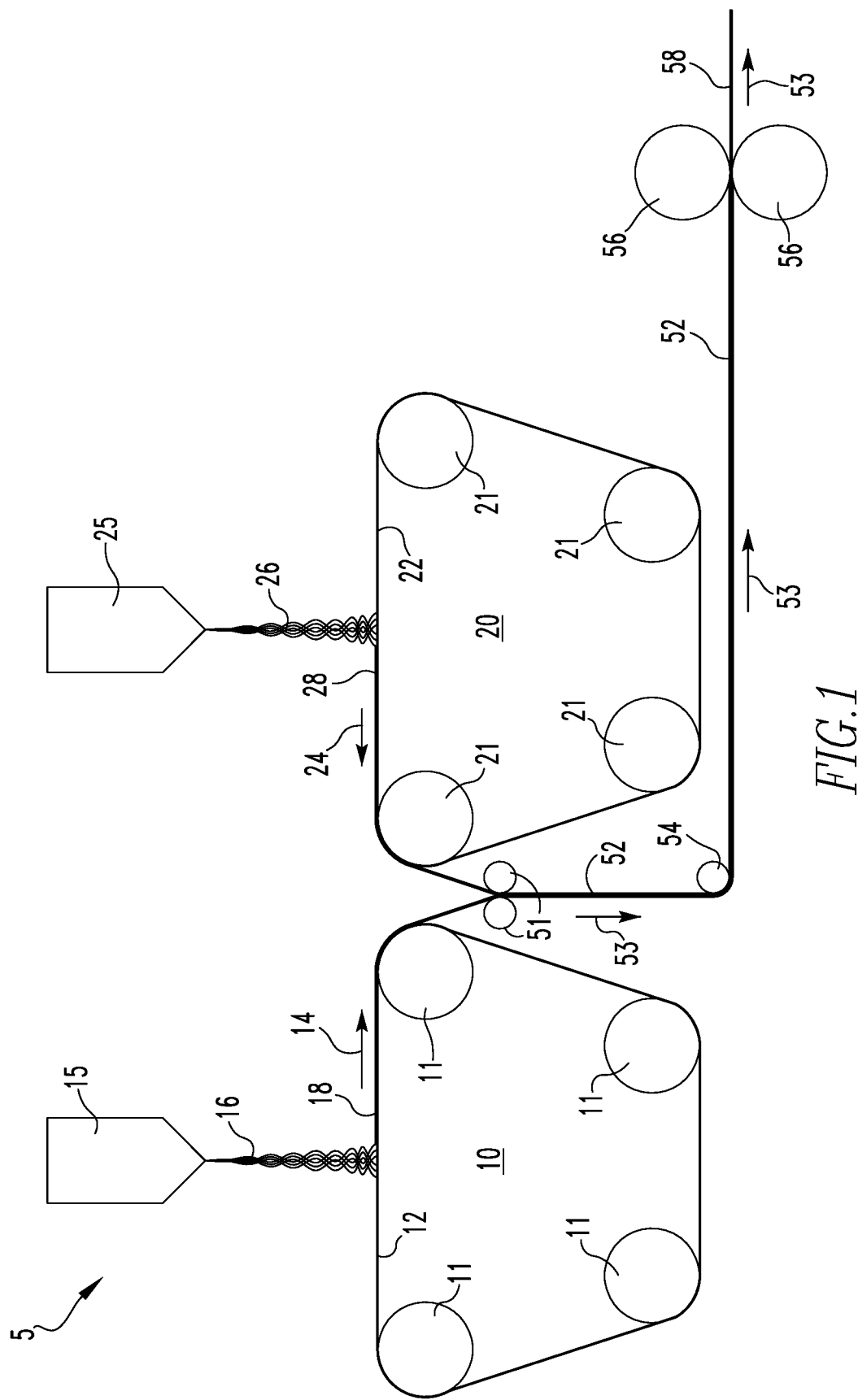
FIG. 1 is a partially schematic drawing of a multi-layer meltblown mat production system of the present invention.
Figure 2:
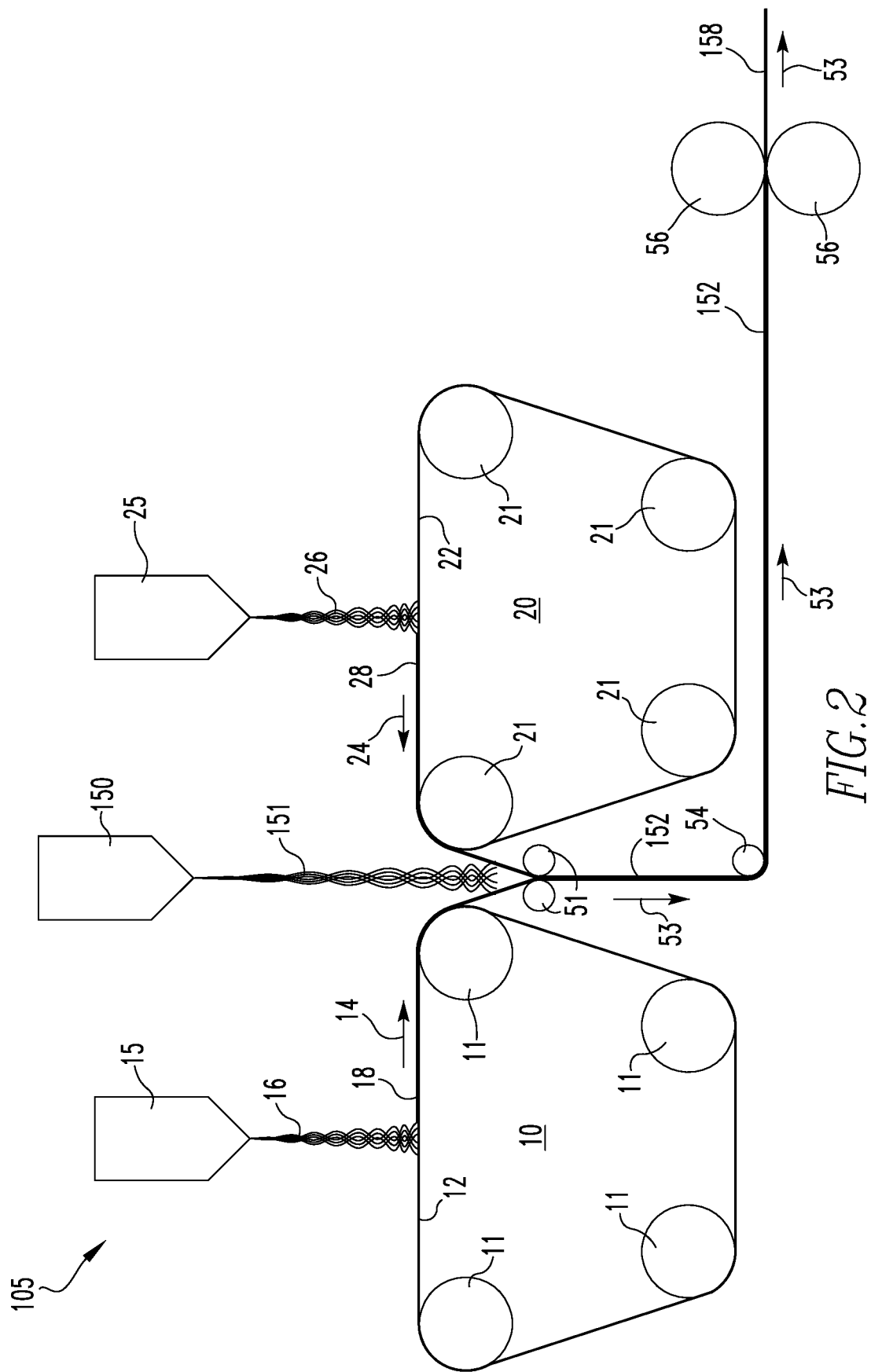
FIG. 2 is a partially schematic drawing of another multi-layer meltblown mat production system of the present invention.
Figure 3:
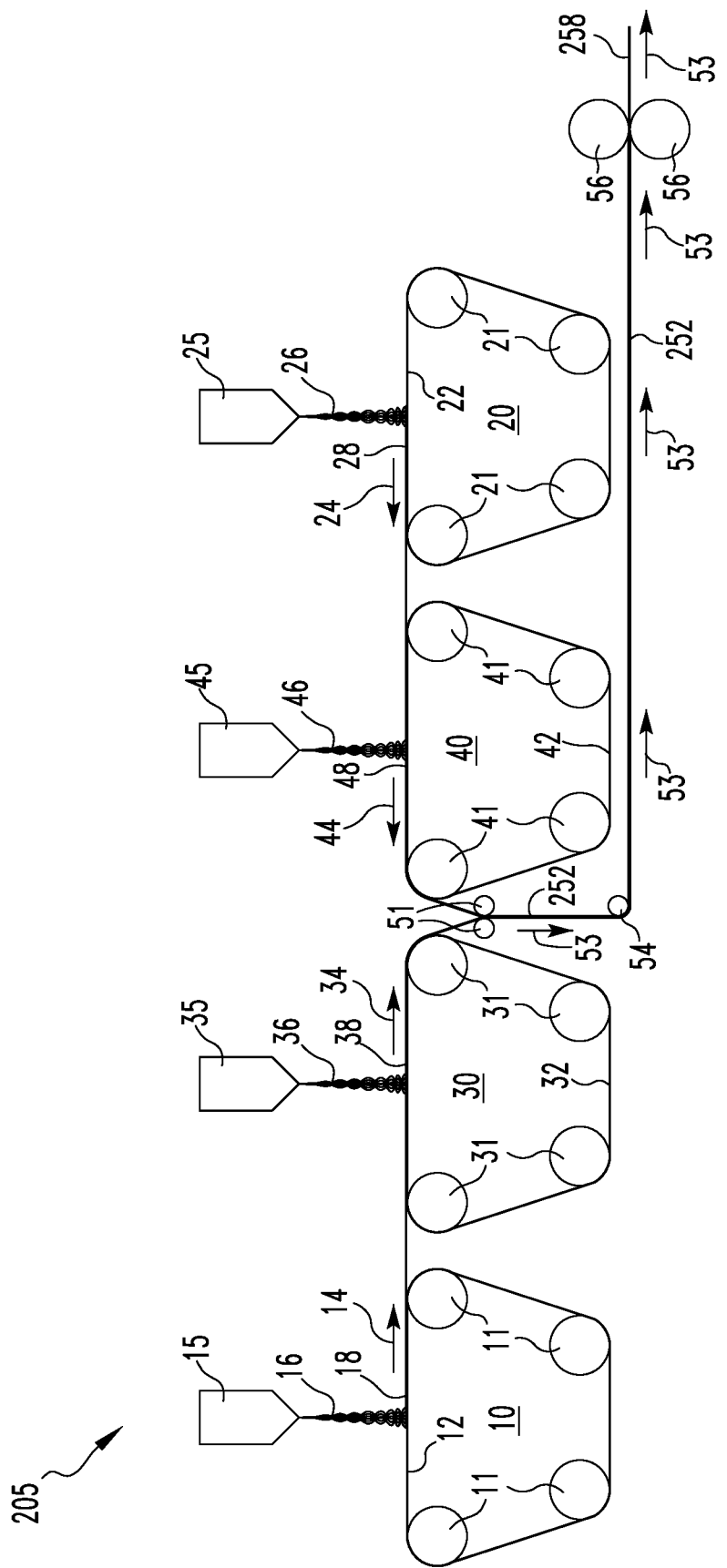
FIG. 3 is a partially schematic drawing of another multi-layer meltblown mat production system of the present invention.

FIGS. 1-3 illustrate and describe systems and methods for making multi-layer meltblown mats in accordance with embodiments of the present invention. As used herein, the term "multi-layer meltblown mat" means a meltblown mat or web formed from separately deposited layers of meltblown fibers that are laminated together during the melt blowing process. The separately deposited meltblown layers each have exposed outer fibers that are brought into contact with adjacent layers when the separately deposited meltblown layers are combined together. The exposed fibers of each meltblown layer may be bonded, fused, adhered or otherwise attached to adjacent layers, such as exposed outer fibers of an adjacent meltblown layer, to form the multi-layer meltblown mat. The present invention eliminates the need for additional pre-manufactured meltblown webs for covering the fibrous top layer of meltblown mats, which have been necessary in the past for providing a smooth non-fibrous top surface.

FIG. 1 schematically illustrates a multi-layer meltblown mat production system 5 in accordance with an embodiment of the present invention. The system 5 includes a first forming box 10 and a second forming box 20. The first forming box 10 includes multiple first rollers 11 rotatable in clockwise directions engaging a first moving surface in the form of a first conveyor belt 12 known to those skilled in the melt blowing art having an upper horizontal surface that travels in a first travel direction 14. A first meltblown head 15 is positioned above the first conveyor belt 12, and dispenses first meltblown fibers 16 onto the top surface of the first conveyor belt 12 to form a first layer of meltblown fibers 18.

The second forming box 20 includes multiple second rollers 22 rotatable in counterclockwise directions engaging a second moving surface in the form of a second conveyor belt 22 having an upper horizontal surface that travels in a second travel direction 24. A second meltblown head 25 is positioned above the second conveyor belt 22, and dispenses second meltblown fibers 26 onto the top surface of the second conveyor belt 22 to form a second layer of meltblown fibers 28. In certain embodiments, suction may be applied through one or both of the first and second conveyor belts 12 and 22 in a manner known to those skilled in the melt blowing art.

As shown in FIG. 1, as the first and second layers of meltblown fibers 18 and 28 disengage from their respective first and second conveyor belts 12 and 22 they are fed through opposed guide rollers 51 to form combined meltblown layers 52 that travel in a combined layer travel direction 53. The combined meltblown layers 52 are contacted by a guide roller 54 and fed through opposing bonding rollers 56 to thereby form a bonded multi-layer meltblown sheet 58, as more fully described below.

As shown in FIG. 1, during operation, the first and second meltblown conveyor belts 12 and 22 travel in opposite directions toward each other. It should be noted that, although FIG. 1 shows two forming areas 10 and 20, any number of forming sections can be used to create the final effect and subsequent product. The first meltblown head 15 deposits the first supply of meltblown fibers 16 onto the first conveyor belt 12, and the second meltblown head 25 deposits a second supply of meltblown fibers 26 onto the second conveyor belt 22. The meltblown fibers 16 and 26 may be made of any suitable materials such as polymers including polypropylene, polyester, polyethylene, polyamides, bi-component fibers and the like. As the first and second meltblown layers 18 and 28 pass through the pair of guide rollers 51, the top portions of the deposited layers come into contact with each other. The spacing of the guide rollers 51 may be adjusted to apply a desired amount of pressure to the first and second meltblown layers 18 and 28 as they pass together through the rollers 51. The guide rollers 51 may typically be spaced apart a distance of from 5 to 50 mm, for example, from 10 to 20 mm.

The guide rollers 51 may be used to align the first and second meltblown layers 18 and 28 in relation to each other for subsequent bonding later in the process. Alternatively, the guide rollers 51 may be used as nip rollers that apply sufficient pressure between the first and second meltblown layers 18 and 28 to at least partially bond a portion of the exposed fibers of the layers together. The guide rollers 51 may be used to apply heat to the combined meltblown layers to initiate the bonding process. Additional equipment may be located downstream from the guide rollers 51 to join the meltblown layers together, either through thermal bonding, ultrasonics, adhesives, hydroentangling, needlepunching, or any other known ways of bonding and/or joining fibers together to produce a nonwoven fabric. If heat is applied to the combined meltblown layers in a region at or near the guide rollers 51, a temperature of from 80 to 400° F. may typically be used, for example, from 120 to 150° F.

Each deposited meltblown layer 18 and 28 typically has a smooth side against its respective conveyor belt 12 and 22, and an opposite fibrous side. The smooth side may be caused by pressing the lower side of each meltblown layer against its respective conveyor belt to generally align the fibers against the contact surface, e.g., the lowermost fibers in each meltblown layer may conform to a smooth planar surface of the underlying conveyor belt. As the first and second meltblown layers 18 and 28 pass through the guide rollers 51, their fibrous sides contact each other and at least a portion of the contacting fibers may be bound to each other, e.g., by heat and/or pressure. As described above, the heat necessary to bind the exposed fiber layers together may be provided at the guide rollers 51, or downstream therefrom. Alternatively, the guide rollers 51 may not be used to apply sufficient heat and/or pressure to bind the meltblown layers 18 and 28 together, and are used to align and feed the adjacent meltblown layers to a bonding stage 56 downstream from the guide rollers.

As shown in FIG. 1, the opposed bonding rollers 56 may be used to bond the fibrous sides of the first and second meltblown layers 18 and 28 together. The two opposed bonding rollers 56 may comprise nip rollers, and the aligned first and second meltblown layers 18 and 28 pass through the rollers 56 in order to bond their fibrous sides together. The bonding rollers 56 rotate in opposite directions with respect to each other, and may be spaced apart a selected distance that applies a desired level of pressure to the first and second meltblown layers 18 and 28 to thereby facilitate bonding of their adjacent fibrous sides. The bonding rollers 56 may typically be spaced apart a distance of from zero to 20 mm, for example, from 3 to 8 mm.

The bonding rollers 56 may be heated in order to help bond the fibrous sides of the first and second meltblown layers 18 and 28 together. In addition to, or in place of, heating the bonding rollers 56, additional heating equipment (not shown) may be provided upstream and/or downstream from the bonding rollers. When heat is applied to the combined meltblown layers 18 and 28 in the bonding area, a temperature of from 100 to 500° F. may typically be used, for example, from 250 to 350° F. It should be noted that the use of bonding rollers 56 is as an example of bonding or joining the meltblown fibers and layers together to form nonwoven fabric. Any other suitable bonding or joining techniques can be applied to create a nonwoven fabric. For example, the fabrics can be bonded or joined through the use of ultrasonics, adhesives or other chemical means, hydroentangling, and the like. After passing through the bonding area, the multi-layer meltblown mat may be wound onto a standard takeup roll, fed to a standard sheeter/stacker, or the like (not shown).

FIG. 2 schematically illustrates a multi-layer meltblown mat production system 105 similar to that shown in FIG. 1, with the addition of an auxiliary head 150 that feeds an additional material 151 to the first and second layers of meltblown fibers 18 and 28, as more fully described below. The combined meltblown layers 18 and 28 and additional material 151 form a laminated sheet 152 that is fed through the opposed binding rollers 56 to form a bonded multi-layer meltblown sheet 158, including the additional material 151 sandwiched between and/or embedded in the first and second layers of meltblown fibers 18 and 28. The region of the opposed rollers 51 where the layers 18 and 28 are joined can form a nip that allows for the introduction, and subsequent containment, of other materials 151, which can offer unique or enhanced properties to the resulting meltblown mat 158.

The additional material(s) 151 fed from the auxiliary head 150 may include flowable materials such as powders, granules, fibers, liquids and the like. Examples of powders include talc, antimicrobial powders, and the like. Examples of fibers include super-absorbent fibers, naturally occurring fibers such as cotton, man-made fibers, and the like. Examples of granules include super-absorbent polymers, salts, and the like. Examples of liquids include surfactants, antistats, alcohol repellants, antimicrobials, and the like. Synthetic or natural fiber materials may enhance the bulk, feel, or other performance enhancing characteristics of the resulting meltblown mat.

Alternatively, the additional material(s) 151 fed from the auxiliary head 150 may include continuous filaments or sheets of material(s). Examples of continuous filaments include reinforcing filaments made of polypropylene, polyethylene, polyester, polyamides, and the like. Examples of sheet materials include reinforcing fabric such as scrim cloth, other nonwoven materials, light weight mesh materials, and the like.

FIG. 3 schematically illustrates a multi-layer meltblown mat production system 205 similar to that shown in FIG. 1, with the addition of a third forming box 30 and a fourth forming box 40. The third forming box 30 includes multiple third rollers 31 rotatable in clockwise directions engaging a third conveyor belt 32 having an upper horizontal surface that travels in a third travel direction 34. A third meltblown head 35 is positioned above the third conveyor belt 32, and dispenses third meltblown fibers 36 onto the top surface of the third conveyor belt 32 to form a third layer of meltblown fibers 38.

The fourth forming box 40 includes multiple fourth rollers 41 rotatable in counterclockwise directions engaging a fourth conveyor belt 42 having an upper horizontal surface that travels in a fourth travel direction 44. A fourth meltblown head 45 is positioned above the fourth conveyor belt 42, and dispenses fourth meltblown fibers 46 onto the top surface of the fourth conveyor belt 42 to form a fourth layer of meltblown fibers 48.

As shown in FIG. 3, the third layer of meltblown fibers 38 is directly deposited on the first layer of meltblown fibers 18, and the fourth layer of meltblown fibers 48 is directly deposited on the second layer of meltblown fibers 28. The combined first, second, third and fourth layers of meltblown fibers 18, 28, 38 and 48 are then fed through the opposing guide rollers 51 to produce combined meltblown layers 252 including four layers. The combined meltblown layers 252 are then fed through the opposing binding rollers 56 to form a bonded multi-layer meltblown sheet 258.

In the embodiments shown, the conveyor belts of the forming boxes are typically operated at the same speeds. In the embodiments of FIGS. 1 and 2, the first and second conveyor belts 12 and 22 may thus be operated at the same speeds. In the embodiment of FIG. 3, the first, second, third and fourth conveyor belts 12, 22, 32 and 42 may thus be operated at the same speeds. Any suitable speed known to those skilled in the art may be used, such as conveyor belt speeds of from 50 to 300 feet/minute, or from 100 to 200 feet/minute, or about 150 feet/minute. The rollers 11, 21, 31 and 41 of each forming box 10, 20, 30 and 40 may be driven and controlled by means known to those skilled in the art. Each forming box 10, 20, 30 and 40 may be powered and controlled independently from the other forming boxes.

Although the use of conveyor belts as the support surfaces for the deposited meltblown fibers are shown in FIGS. 1-3, it should be understood that other moving surfaces, such as forming drums known to those skilled in the melt blowing art, may be used in place of the conveyor belts.

The multi-layer meltblown mats of the present invention may have any suitable overall thickness. The first and second meltblown layers 18 and 28 may have the same or different thicknesses prior to being combined together. In addition, the first and second meltblown layers 18 and 28 may include different types of fibers, may have different fiber densities, etc. The multi-layer meltblown mats may have any desired basis weight, for example, from 5 to 2,000 $g/m^2$, or from 10 to 1,000 $g/m^2$. Relatively heavy absorbent mats may typically have weights of greater than 100 $g/m^2$, such as from 150 to 600 $g/m^2$, or from 200 to 300 $g/m^2$. Relatively light absorbent mats or pads may typically have weights of less than 100 $g/m^2$, or less than 50 $g/m^2$, for example, from 5 to 30 $g/m^2$, or from 10 to 20 $g/m^2$.

The multi-layer meltblown mats may be made in any desired widths, for example, from 10 inches to 20 feet wide, or from 1 to 10 feet wide, or from 2 to 8 feet wide, or from 5 to 7 feet wide.

The first and second conveyor belts 12 and 22 may have web forming surfaces that provide the same or different surface effects on the outer exposed surfaces of the first and second layers 18 and 28. The final multi-layer mats may thus be provided with outer surfaces having desired finishes created by direct contact of the meltblown fibers on the forming surfaces of the first and second conveyor belts 12 and 22.

A three-dimensional effect may be provided on one or both exposed outer surfaces of the mats. This may be desirable for products where the surface has a rougher surface to provide, for example, a wiping product that has scrubbing abilities. There also may be a need for a product that has the ability to capture and hold dirt or other contaminants. There further may be a need for a product were a smooth, pillow-top like surface to desired for skin contact or contact with other surfaces where sensitivity is desired. There may be a need for a product that has two distinctive surfaces. Because the present multi-layer meltblown mats are made from at least two different forming boxes with the ability to utilize different forming surfaces, there exists the possibility to produce materials with two different, distinctive surfaces. Furthermore, as the final fabric is produced from different meltblown forming boxes, there exists the possibility to utilize different additives which can provide additional differences to the feel and color of the surfaces.

The pattern of the forming surface imparted onto the surface of each exposed outer meltblown layer may be variable and controllable, e.g., through the control of the various processes of the meltblown production. For example, by increasing or decreasing the below-belt suction it is possible to increase or decrease the visual impact and/or subsequent feel of surface of the meltblown layer. In addition, adjusting the melt and die temperatures of the meltblown extrusion process may also produce similar effects.

As used herein, "including," "containing" and like terms are understood in the context of this application to be synonymous with "comprising" and are therefore open-ended and do not exclude the presence of additional undescribed or unrecited elements, materials, phases or method steps. As used herein, "consisting of" is understood in the context of this application to exclude the presence of any unspecified element, material, phase or method step. As used herein, "consisting essentially of" is understood in the context of this application to include the specified elements, materials, phases, or method steps, where applicable, and to also include any unspecified elements, materials, phases, or method steps that do not materially affect the basic or novel characteristics of the invention.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. In this application and the appended claims, the articles "a," "an," and "the" include plural referents unless expressly and unequivocally limited to one referent.

Whereas particular embodiments of this invention have been described above for purposes of illustration, it will be evident to those skilled in the art that numerous variations of the details of the present invention may be made without departing from the invention as defined in the appended claims.

What is claimed is:

1. A method of making multi-layer meltblown mats comprising:
    depositing first meltblown fibers onto a first moving surface to form a first layer of meltblown fibers;
    depositing second meltblown fibers onto a second moving surface to form a second layer of meltblown fibers;
    feeding the first layer of meltblown fibers and the second layer of meltblown fibers through opposed rollers to form combined meltblown layers comprising the first layer of meltblown fibers and the second layer of meltblown fibers; and
    bonding the combined meltblown layers to produce a bonded multi-layer meltblown sheet, wherein the bonded multi-layer meltblown sheet has a first outer exposed surface formed by contact of the first layer of meltblown fibers with the first moving surface and a second outer exposed surface formed by contact of the second layer of meltblown fibers with the second moving surface.

2. The method of claim 1, wherein the first moving surface is provided on a first conveyor belt, and the second moving surface is provided on a second conveyor belt.

3. The method of claim 2, wherein the first conveyor belt and the second conveyor belt move in opposite directions toward each other to thereby feed the first layer of meltblown fibers from the first conveyor belt to the opposed rollers and feed the second layer of meltblown fibers from the second conveyor belt to the opposed rollers.

4. The method of claim 3, wherein the opposed rollers are guide rollers that align the first meltblown layer and second meltblown layer in relation to each other.

5. The method of claim 4, wherein the guide rollers are heated to at least partially bond the combined meltblown layers together.

6. The method of claim 4, further comprising feeding the combined meltblown layers from the guide rollers to opposed bonding rollers that bond the combined meltblown layers together.

7. The method of claim 6, wherein the bonding rollers are heated.

8. The method of claim 3, wherein the opposed rollers are bonding rollers that bond the combined meltblown layers together.

9. The method of claim 8, wherein the bonding rollers are heated.

10. The method of claim 1, further comprising supplying an additional material to the first layer of meltblown fibers and the second layer of meltblown fibers prior to the feeding of the first layer of meltblown fibers and the second layer of the meltblown fibers through the opposed rollers.

11. The method of claim 10, wherein the additional material comprises a flowable material selected from powders, granules, fibers and liquids.

12. The method of claim 10, wherein the additional material comprises fibers, filaments or sheet materials.

13. The method of claim 10, wherein the additional material is water-absorbent or oil-absorbent.

14. The method of claim 3, further comprising depositing third meltblown fibers onto a third conveyor belt to form a third layer of meltblown fibers, and feeding the third layer of meltblown fibers through the opposed rollers with the first layer of meltblown fibers and the second layer of meltblown fibers.

15. The method of claim 14, wherein the third conveyor belt is located adjacent to the first conveyor belt, the first layer of meltblown fibers is fed from the first conveyor belt onto the third conveyor belt, and the third meltblown fibers are deposited onto the first layer of meltblown fibers on the third conveyor belt.

16. The method of claim 14, further comprising depositing fourth meltblown fibers onto a fourth conveyor belt to form a fourth layer of meltblown fibers, and feeding the fourth layer of meltblown fibers through the opposed rollers with the first layer of meltblown fibers, the second layer of meltblown fibers, and the third layer of meltblown fibers.

17. The method of claim 16, wherein the fourth conveyor belt is located adjacent to the second conveyor belt, the second layer of meltblown fibers is fed from the second conveyor belt onto the fourth conveyor belt, and the fourth meltblown fibers are deposited onto the second layer of meltblown fibers on the second conveyor belt.

18. An apparatus for making multi-layer meltblown mats comprising:
    a first forming box comprising a first conveyor belt and a first meltblown head located above the first conveyor belt structured and arranged to deposit first meltblown fibers onto the first conveyor belt to form a first layer of meltblown fibers;
    a second forming box comprising a second conveyor belt and a second meltblown head located above the second conveyor belt structured and arranged to deposit second meltblown fibers onto the second conveyor belt to form a second layer of meltblown fibers; and
    opposed rollers adjacent the first forming box and the second forming box structured and arranged to receive and combine together the first layer of meltblown fibers from the first conveyor belt and the second layer of meltblown fibers from the second conveyor belt to thereby form combined meltblown layers comprising the first layer of meltblown fibers and the second layer of the meltblown fibers.

19. The apparatus for making multi-layer meltblown mats of claim 18, wherein the first conveyor belt and the second conveyor belt move in opposite directions toward each other to thereby feed the first layer of meltblown fibers from the first conveyor belt to the opposed rollers and feed the second layer of meltblown fibers from the second conveyor belt to the opposed rollers.

20. The apparatus for making multi-layer meltblown mats of claim 19, wherein the opposed rollers are guide rollers that align the first meltblown layer and second meltblown layer in relation to each other.

21. The apparatus for making multi-layer meltblown mats of claim 20, wherein the guide rollers are heated to at least partially bond the combined meltblown layers together.

22. The apparatus for making multi-layer meltblown mats of claim 19, wherein the opposed rollers are bonding rollers that bond the combined meltblown layers together.

23. The apparatus for making multi-layer meltblown mats of claim 22, wherein the bonding rollers are heated.

24. The apparatus for making multi-layer meltblown mats of claim 18, further comprising an auxiliary head structured and arranged to supply an additional material to the first layer of the meltblown fibers and the second layer of the meltblown fibers prior to the receiving of the first layer of meltblown fibers and the second layer of meltblown fibers by the opposed rollers.

25. The apparatus for making multi-layer meltblown mats of claim 18, further comprising a third forming box located adjacent to the first conveyor belt comprising a third conveyor belt and a third meltblown head located above the third conveyor belt structured and arranged to deposit third meltblown fibers onto the third conveyor belt to form a third layer of meltblown fibers, wherein the first layer of meltblown fibers is fed from the first conveyor belt onto the third conveyor belt, and the third meltblown fibers are deposited onto the first layer of meltblown fibers on the third conveyor belt, depositing third meltblown fibers onto a third conveyor belt to form a third layer of meltblown fibers, and feeding the third layer of meltblown fibers through the opposed rollers with the first layer of meltblown fibers and the second layer of meltblown fibers.

26. The apparatus for making multi-layer meltblown mats of claim 25, further comprising a fourth forming box located adjacent to the second conveyor belt comprising a fourth conveyor belt and a fourth meltblown head located above the fourth conveyor belt structured and arranged to deposit fourth meltblown fibers onto the fourth conveyor belt to form a fourth layer of the meltblown fibers, where the second layer of meltblown fibers is fed from the second conveyor belt to the fourth conveyor belt, and the fourth meltblown fibers are deposited onto the second layer of meltblown fibers on the second conveyor belt depositing fourth meltblown fibers onto a fourth conveyor belt to form a fourth layer of meltblown fibers, and feeding the fourth layer of meltblown fibers through the opposed rollers with the first layer of meltblown fibers, the second layer of meltblown fibers, and the third layer of meltblown fibers.

\* \* \* \* \*